Figure 1:
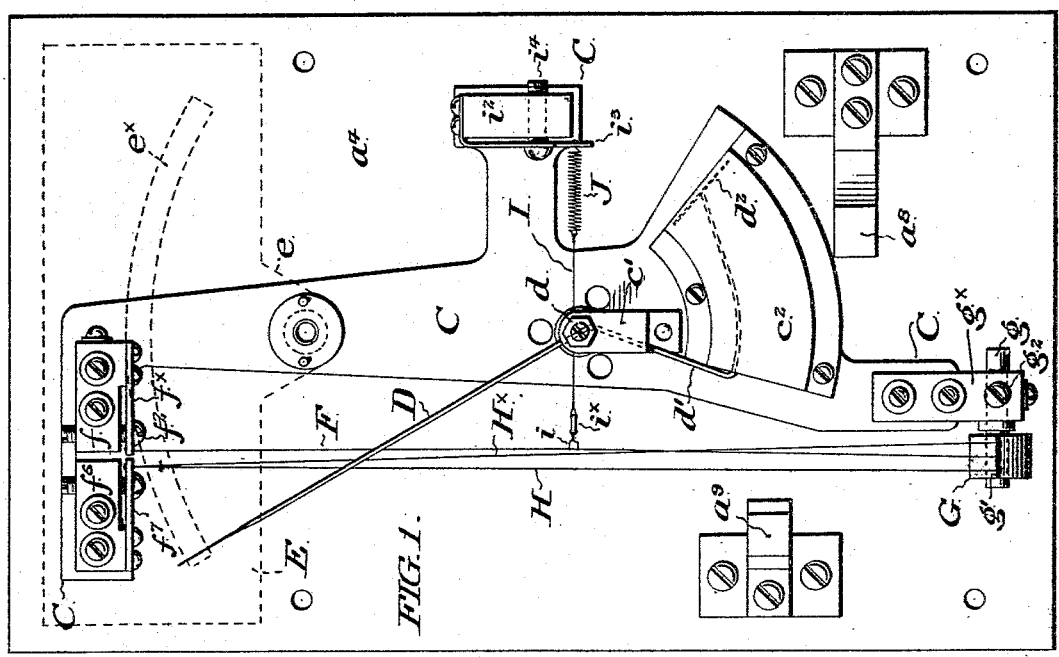

(No Model.) 4 Sheets—Sheet 1.

E. G. WILLYOUNG & M. M. GARVER.
ELECTRICAL MEASURING INSTRUMENT.

No. 514,582. Patented Feb. 13, 1894.

WITNESSES:
F. Norman Dixon
James Loughran.

INVENTORS:
ELMER. G. WILLYOUNG
MADISON. M. GARVER
By their Attorneys,
Wm C. Strawbridge
J Bonsall Taylor

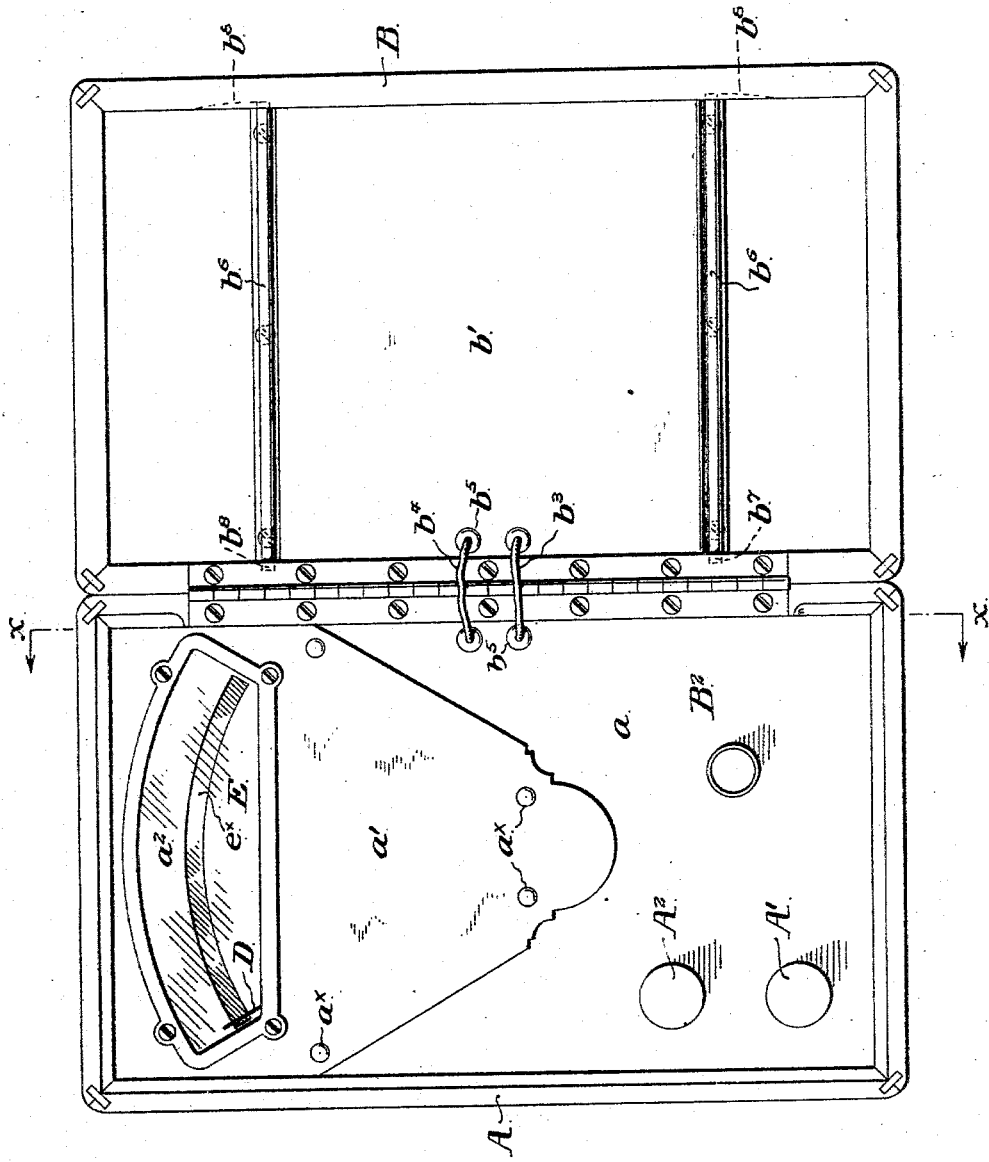

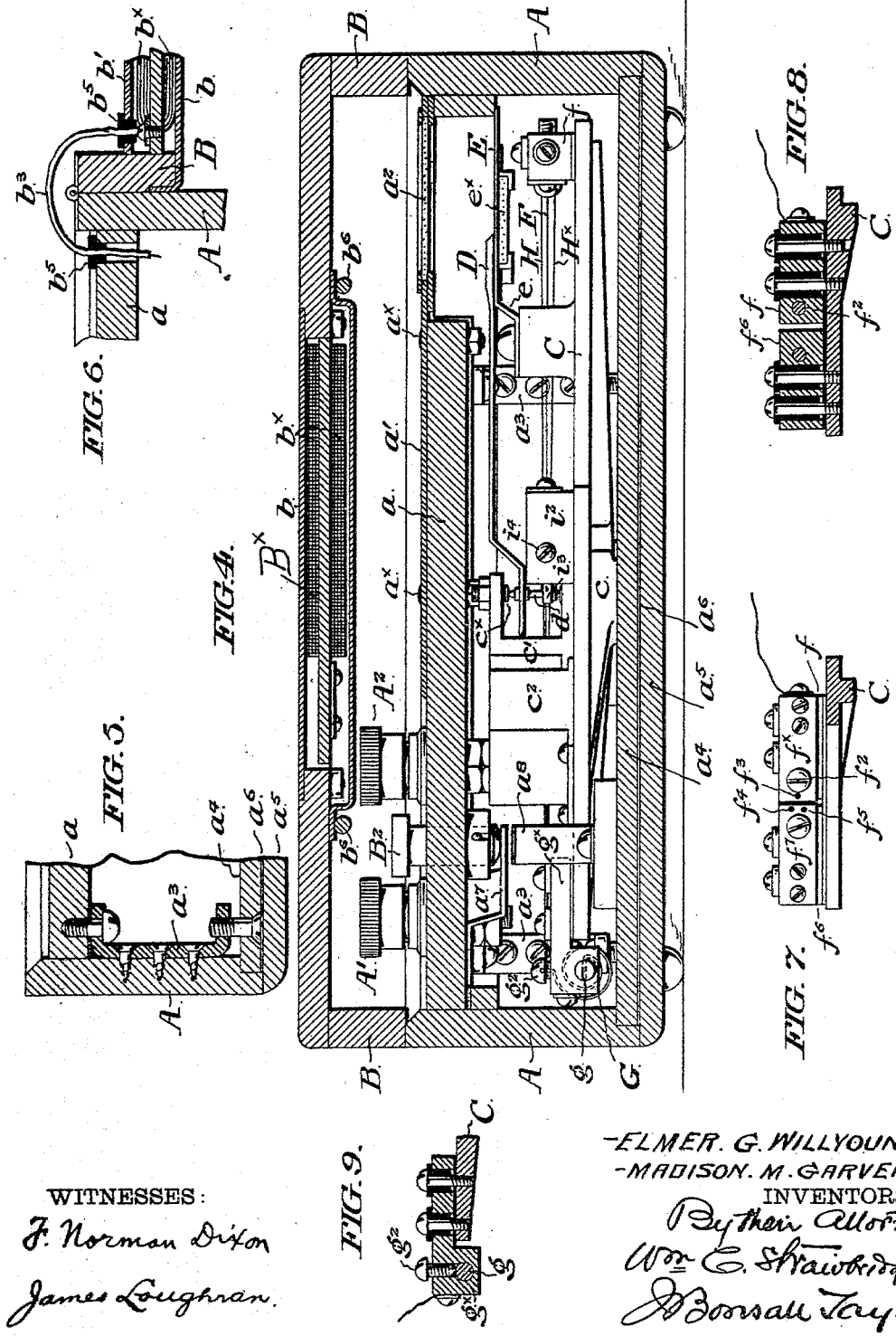

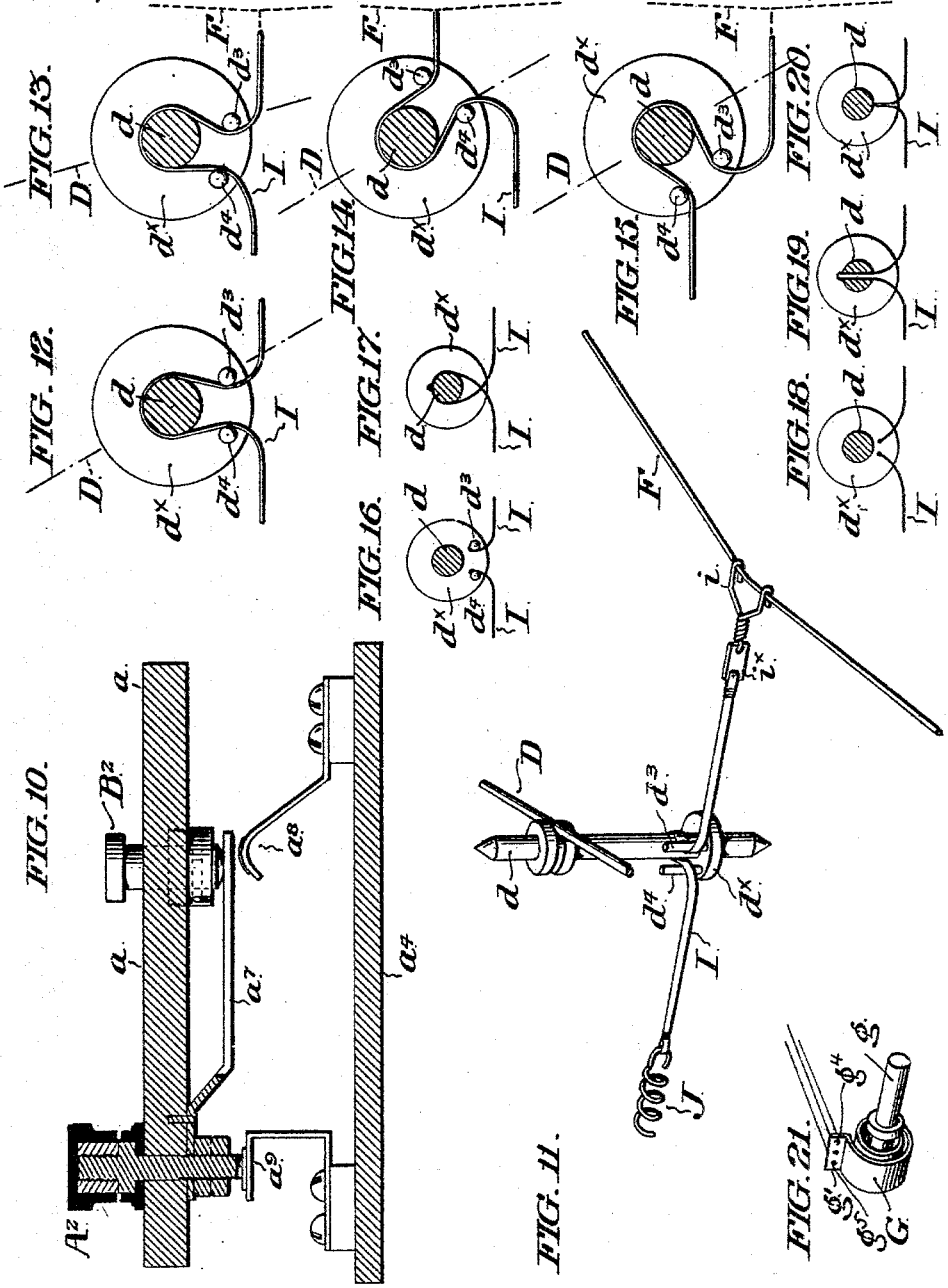

UNITED STATES PATENT OFFICE.

ELMER G. WILLYOUNG AND MADISON M. GARVER, OF PHILADELPHIA, PENNSYLVANIA, ASSIGNORS TO THE QUEEN & COMPANY, INCORPORATED, OF SAME PLACE.

ELECTRICAL MEASURING-INSTRUMENT.

SPECIFICATION forming part of Letters Patent No. 514,582, dated February 13, 1894.

Application filed October 13, 1893. Serial No. 488,049. (No model.)

*To all whom it may concern:*

Be it known that we, ELMER G. WILLYOUNG and MADISON M. GARVER, citizens of the United States, residing in the city and county of Philadelphia, in the State of Pennsylvania, have invented certain new and useful Improvements in Electrical Measuring-Instruments, of which the following is a specification.

Our invention relates to that class of electric meters for measuring the voltage of direct or alternating currents of electricity, which makes use of the heating effect of a current upon a wire conductor through which it is caused to pass, to occasion the linear expansion of said conductor, the extent of the expansion being indicated upon a scale by a pointer to which the movement of the conductor is suitably transferred. The leading instrument of this class is known as the "Cardew volt-meter," the fundamental type of which is described and shown in United States Letters Patent No. 342,777, granted June 1, 1886, to Philip Cardew.

Our present invention embodies improvements upon an instrument of the foregoing class, patented to the said Elmer G. Willyoung in and by United States Letters Patent No. 491,457, bearing date of February 7, 1893, to which reference is directed. In the Willyoung patented instrument, the wire conductor through which the current is passed, herein termed the "working" wire, and a given expansion of which is to be measured, is supported in a condition of tension between a fixed support and an adjustable support respectively located at opposite ends of a longitudinally-extending metal supporting-rod, which possesses the same coefficient of expansion as the tense conductor, but is of greater cross-section and superior mass. To the central portion of the working wire a pivoted needle or pointer made "dead beat" by a dash-pot contrivance, is connected by a transverse connection composed, as indicated in the patent, of a link connected at one end with the working wire in any preferred manner, and at the other end with a pointer through the medium of a knife-edged pin upon the pointer,—and also of a take-up or compensating spring adapted to take up the slack of the link arising from the relaxation of the working wire under the passage of the current, the inner end of which spring is connected with the pointer through the medium of a knife-edged pin, and the outer end with any point of fixed support. The dash-pot contrivance applied to the rear end of the pointer,—the bearings which support the axial pin or pivot of the pointer,—and the bracket which carries the compensating supporting-rod of the working wire,—are all erected from a carrying frame or plate which is supported from the bottom of the case at a place of small area, in order to obviate any relative change of position of the several parts of the instrument which might arise from the extension, contraction, warping, or splitting, of the material of the case. Applied to the movable cover of the case is an extra or "dead" resistance connected with the working wire in series or in shunt.

It is the object of our present invention to improve upon Willyoung's above described patented instrument, more particularly in connection with the means employed for supporting and maintaining in a state of tension the working wire,—with the means for connecting the pointer with the working wire and with the take-up spring,—and with the devices composing the dead or extra resistance applied to the cover of the case.

The invention further contemplates improvements in the general detail of the construction and of the mode of application of the parts, and in the method of sealing the case against meddlesome inspection or unskilled adjustment of the working parts.

An instrument embodying a good form of our improvements is represented in the accompanying drawings and hereinafter described, the particular subject-matter claimed as novel being herinafter definitely specified.

Figure 2:
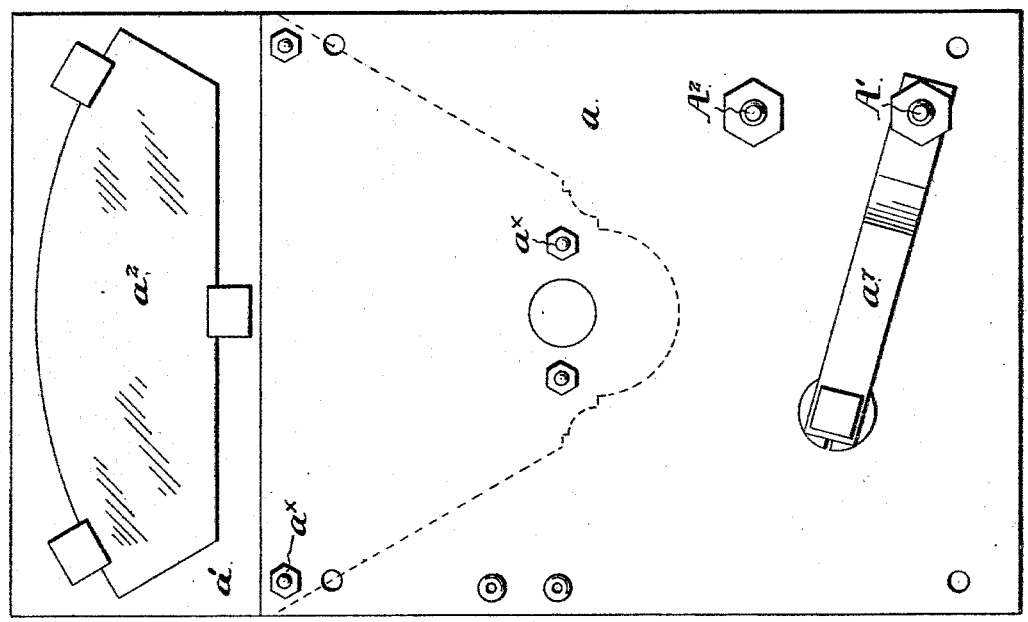

In the drawings, Figure 1 is a top plan view of the base or inner bottom of the instrument removed from the case, and shown as provided with the carrying plate and with the working parts of the instrument hereinafter referred to. Fig. 2 is a bottom plan or under side view of the face plate and name plate removed from the case. Fig. 3 is a top plan view of the instrument as cased, depicted as thrown open as in use. In this view the face plate and name plate conceal the working parts, except that the point of the indicating needle and the scale appear through the glass of the name plate. Fig. 4 is a longitudinal side elevation, partly sectional, of the instrument with the case closed, section being supposed in the plane of the dotted line $x—x$ of Fig. 3, and sight being taken in the direction of the arrows upon said line. The view exhibits the entire interior of the instrument. Fig. 5 is a fragmentary, longitudinal, sectional, elevational detail of a portion of the casing, illustrating the mode of securing the face plate and the base. Fig. 6 is a fragmentary, transverse, sectional, elevational, detail of portions of the body and cover of the case, illustrating the mode of connecting the extra resistance in the cover with the conductors forming the circuit in the case. Fig. 7 is a face elevational view of the adjusting blocks to which the distant ends of the working and the compensating wires are connected. Fig. 8 is a longitudinal, vertical, central, sectional, elevation through the same. Fig. 9 is a view similar to Fig. 8 through the adjusting block which carries what we term the compensating spring support. Fig. 10 is a vertical, transverse, partly sectional and partly elevational, detail of a portion of the case, and of the binding posts and their fixed and spring contacts. Fig. 11 is a view in perspective of a portion of the working wire, of the axial pin of the pointer, the take-up spring, and the filament connection from the working wire via the axial pin to the take up spring. Figs. 12 to 20 are details showing the various positions of the filament-connection relatively to the axial pin and various modes of effecting its attachment thereto. Fig. 21 is a perspective view of the spiral spring support for the working and compensating wires.

Similar letters of reference indicate corresponding parts.

In the drawings, A is the case or box, of any preferred construction, and provided with a face plate $a$, preferably of vulcanized rubber, and conveniently extending about two-thirds of the length of the case. Superimposed upon this face plate and completing the top-inclosure of the box is a name plate $a'$, preferably of brass, having a glass-covered opening $a^2$ through which the pointer and scale may be inspected. The face plate is conveniently secured by angle irons $a^3$, the screws for which have their heads within the box, as shown in Figs. 4 and 5. The name plate is conveniently secured by bolts $a^\times$ having smoothly turned heads and the shanks of which pass through the face plate and are retained by nuts applied within the box as shown in Figs. 2 and 3.

The case has two bottoms, an inner one which we term the base $a^4$, and an outer one which we term the supplemental bottom $a^5$. Upon the inner bottom is mounted the carrying plate C, and the contacts $a^8$ and $a^9$ for the binding posts A' and A² which pass through the face plate and of which A' is equipped with the spring contact $a^7$, as shown in Figs. 2 and 4.

In the assembling of the parts of the instrument, and subsequent to the above mentioned application of the face plate and name plate, the base with its carrying plate and supported appliances is secured by screws, screwed into the walls from its under surface, the heads of which are then sealed by a maker's label $a^6$, and the supplemental bottom is then applied and secured in any convenient manner.

It will now be understood that after resort to the foregoing method of assemblage and inclosure of the parts, the contents of the body of the case cannot be interfered with except after removal of the seal formed by the maker's label.

B is the cover of the case, preferably of the construction shown, and possessing depending sides of some depth so as to afford a considerable air space between the upper face of the face plate and the under surfaces of the cover. The extra resistance coil B$^\times$, Figs. 3 and 4, which is applied to the cover, is inclosed within a chamber $b^\times$ formed by inclosing a slot or opening through the top surface of the cover, preferably of its full width and of about half its length, with an upper plate of metal, $b$, flush with the outer surface of the cover, and with an under plate of metal, $b'$. These plates become in effect part of the lid, and they serve as a means of effectually getting rid of the heat developed in the extra resistance, because when heated by direct conduction from the resistance, by themselves presenting a large surface for radiation, they rapidly dispose of this heat and thus prevent the resistance itself from becoming dangerously warm. To prevent tampering with the extra resistance, the under plate, $b'$, of the cover chamber is first, along its flanged edges, Figs. 3 and 4, screwed to the inner face of the cover, and the screw heads are then protected by rods, $b^6$, which are respectively at one end applied to the apertures $b^7$, in one wall of the cover, and at the other are adapted to segmental slots, $b^8$, in the opposite wall of the cover, which slots are then filled with a plastic such as wax, and sealed with the maker's seal.

Electrical connection of the working wire to the extra resistance, is made by flexible conductors, $b^3$, $b^4$, which pass through insulating thimbles, $b^5$, respectively, in the under plate $b'$ of the cover chamber $b^\times$, and in the face plate of the body of the case, as shown in Figs. 3 and 6, and which serve to connect said resistance coil in series or in shunt with the circuit of the working wire.

B² is a push button passing through the face plate $a$ and adapted to force a spring contact $a^7$, springing from the terminal A', into connection with a contact $a^8$ erected from the base of the case, so as, at will, to establish the circuit through the instrument;—it being, of course, understood that the terminal A² is in constant electrical contact with the contact $a^9$, also erected from the base of the case, and that said contacts, $a^3$ and $a^9$, are connected with conductors which complete the circuit of the instrument through the working wire and the extra resistance, whether coupled in series or in shunt.

C is a metal frame which we term the carrying plate, and which is well made when in the form represented in Fig. 1. This plate is erected and supported in a horizontal position from the base plate, $a^4$, of the instrument at a place of small area,—the under face of the plate being, to such end, conveniently provided with a downward projecting boss $c$, Fig. 4,—and it carries the working parts of the instrument.

D is a needle or pointer adapted for oscillatory movement by being connected with an axial pin $d$, Figs. 4 and 11, the tapering pivot points of which are adapted to jeweled bearings $c^x$ in a needle housing or yoke $c'$, springing from the central portion of the carrying plate, C, and suitably formed. The rear extension, $d'$, of the pointer carries a piston $d$ adapted to a segmental piston cylinder or housing $c^2$ erected from the carrying plate, to render the pointer "dead beat."

E is a scale plate conveniently supported by a bracket $e$ springing from the carrying plate. The scale plate carries a reflecting mirror $e^x$ in connection with its scale.

The carrying plate and its associated appliances, so far as already described, are elements of the instrument of the Willyoung patent referred to. In that instrument, as hereinbefore mentioned, the working wire was supported longitudinally of the carrying plate by a compounded bar possessing the same coefficient of expansion, as it itself possessed, to the ends of which bar said wire was permanently connected with a capacity for adjustment at one end. In order that the supporting bar should possess the requisite stiffness to permit of the necessary stretching of the working wire, it was of much greater diameter than said wire, and, in consequence, possessed much greater mass. By virtue, however, of the possession by it of the same coefficient of expansion as the wire, the general and relatively slow changes of room temperature were without effect upon the instrument, the wire and bar expanding equally. In the passage of the current, however, the heating and expansion of the working wire, by virtue of its lesser mass, was almost instantaneous, the pointer being deflected through a given arc, while the expansion of the bar under the radiated heat was, by reason of its mass, slower. The temperature of the bar, therefore, lagged behind, so to speak, that of the air surrounding it, while the wire by virtue of its small mass, instantly added the increase of air temperature to its own, with the result that the pointer, under the continued flow of the current through the working wire, slowly increased its deflection until the heat lost from the instrument exactly equaled the heat generated in the wire. When, then, the current continued to further flow, the pointer slowly decreased its deflection under the gradual expansion of the compensating bar as the latter gradually acquired the temperature of the interior of the instrument. A reverse phenomenon was observable when the current was turned off or decreased. The working wire, being small, would instantly assume and retain the temperature within the case, but the compensating rod, being large, would lag behind and remain constantly warmer than the air of the case as the case continued to lose and come down to the temperature corresponding to the decreased or entirely interrupted current. These conditions, therefore, militated against instantaneous, accurate registry, and we have sought to avoid them by the provision of a novel means of applying, supporting, and stretching, the working wire.

F, Figs. 1 and 11, is the working wire, of any suitable metal, and preferably composed of platinum and silver. One extremity of this wire is electrically connected with an adjusting block, $f$, erected at one end of the carrying frame, and provided with a spring plate $f^x$, controlled by an adjusting screw, $f^2$, through a hole $f^3$, Fig. 7, in which plate the working wire is conveniently passed and soldered. At its other extremity the working wire is connected with the free end of a spiral band spring, which we term the compensating spring support G, the inner end of which is conveniently secured by being affixed to a transverse stud, which we term the spring stud $g$, and which is rotatably housed in an adjusting block $g^x$ applied to the other extremity of the carrying frame. The set of the stud and the band spring, is controlled by an adjusting screw $g^2$ which locks said stud in any desired position.

The free end of the spring support G is conveniently provided with an up-turned flange $g'$ through a hole in which the end of the working wire is passed and secured. The working wire, when the parts are adjusted, is thus stretched between the block $f$ and the compensating spring support G.

H H$^x$ are a pair of compensating wires each possessing the same substance as the working wire, and hence the same coefficient of expansion, and being practically equal to it in length and diameter. At one end each of these wires is passed through an appropriate hole $g^4 g^5$ in the flange $g'$, and thereby secured to the spring support. At the other end each of these wires is secured, preferably by being passed through an appropriate hole ($f^4 f^5$), Fig. 7, in the spring plate $f^7$ of an adjusting block $f^6$, being a counterpart of the adjusting block $f$, and erected abreast it upon one extremity of the carrying plate C. The working wire and the compensating wires are, in their application, adjusted to equal lengths, the compensating wires being placed under similar initial tension, namely that of the spring support G.

In operation the current is, of course, established only through the working wire. The mechanical function of the compensating wires is to maintain a distance between the two points of support of the extremities of the working wire which shall vary with and be dependent only upon the temperature of the air immediately adjacent to the working wire.

We have represented two compensating wires because we prefer to use two, but, provided the coefficient of expansion be as to each compensating wire identically that of the working wire, one compensating wire, or a series of compensating wires greater than a series of two and arranged in parallelism, will answer the purposes of our invention in this regard, provided, however, the wire or series of wires in association with the working wire itself, be sufficient to control the spring against rupture of the working wire. Or, instead of round compensating wires, we may use flat strips of the same material and thickness as the working wire, and of any width desired within the mechanical possibilities of the instrument. We have, by slightly changing the form of the spring plate $f^7$, been enabled to use a flat strip having a width equal to that of the spring support G. Such a strip is obviously the equivalent of a large number of wires each of the diameter of the working wire and laid very close together. Such a strip will, therefore, respond to temperature changes as quickly as wires while adding much to the stiffness and strength of the instrument.

We are aware that in hot wire instruments operating upon the principle of the Cardew meter, for instance in the electric meter patented February 12, 1889, by United States Letters Patent No. 397,538, to Henry H. Cutler, and in the electrical measuring instrument patented June 9, 1891, in and by United States Letters Patent No. 453,681, to Frank C. Wagner,—two substantially similar and equal wires, one of which forms part of a circuit through which the current to be measured is caused to pass, are represented and described, and as to the broad idea of the employment of two wires in an electric meter, we lay no claim.

Certain distinctions between the devices of Cutler and of Wagner and this of ours require explanation:—It is essential to the successful operation of an instrument of this class that the working wire should be very fine in order to work quickly, a large wire being sluggish and lagging a little behind any change, that is to say taking time to acquire any new temperature induced by a new value of current. For this reason the compensating support should be of the same substance and of the same or nearly the same diameter as the working wire. Now in our instrument the compensating wire is a device for regulating the distance between the points of support of the working wire, which must be stretched by a force sufficient to keep it straight but yet controlled against breaking it if otherwise potent so to do. This force is the spiral spring support to which one end of the working wire is attached, and which if not itself maintained under considerable tension will easily be put into vibration and thereby affect the stability of the pointer. This spring, therefore, should be tense. If, therefore, the spring when used with but two wires of the preferred diameter, the working and the compensating, be under such sufficient tension as not to vibrate, its resilient force will be apt to be sufficient to slowly stretch the compensating wire in such manner as to permanently and continuously deform and elongate it, with the resultant corresponding and continuous creeping of the pointer. It is to avoid these disadvantageous conditions that we employ two or more compensating wires, which by permitting us to employ an adequately stiff spring afford us a compensating device possessing not only requisite tensile strength, but yet acting as instantaneously as though but one wire were used,—for, the mere numerical increase of the compensating wires placed in parallel has no effect upon the quickness of the movement.

The spiral band spring or support is, as explained, mounted in a vertical plane upon a horizontal stud, $g$, and this is to avoid the gravitational element that would be apt to enter in were a flat spring employed as a substitute for a spiral,—it being, in fact, necessary, in order to secure with a flat spring, acting as a spring support for wires, a sufficiently uniform pull through a sufficiently great distance, to make the spring so long that the gravitational element will enter in, and render it necessary that the instrument be very carefully leveled in order to keep the pointer on zero and prevent its moving purely from changes of level.

In contradistinction to the foregoing considerations as they affect our device, the Cutler instrument is so organized that its pointer operates by the throw of a lever to which the free ends of two substantially similar and equal wires, through one of which a current is passed, are connected,—the lever being deflected about its pivot between the wires when the energized wire relaxes. In this instrument the lever is connected with a flat spring which serves as a tension device to subject both wires to equal tension. The instrument would be subject to the gravitational factor.

In the Wagner instrument, the two substantially similar and equal wires employed, which are disposed in parallel and through one of which only the current is caused to pass, are both securely fixed at each of their extremities. The wire which is not energized, and which is connected with the wire that is adapted to be energized by a central transverse link connection operative upon the pointer,—acts simply as a "take-up" to compensate for the relaxation of the active wire, although serving to eliminate the effects upon the pointer of changes in the length of the active wire due to differences in the temperature within the case.

Referring now to our improvements so far as they relate to the transverse connection between the working wire and the pointer,—it is our object to obviate even the slight friction which was incident to the knife-edged apertures and links respectively connecting the working wire and the axial or pivot pin of the pointer and the take-up spring of said pivot pin of my patented instrument, and to provide a connection of extreme sensitiveness, in which the friction is reduced to a minimum and in the preferred form of which adjustment of the relative deflections of the pointer may be made.

To the foregoing ends we resort to the following construction which is that which we prefer, and which is especially illustrated in Figs. 11, 12, 13, 14, and 15.

I is a filament, extending transversely from the central portion of the working wire across to the take-up spring J, and engaged in its course with the axial pin, $d$, of the pointer. This filament is preferably rolled from phosphor bronze, but may be of any suitable metal, and it is preferably, although not restrictively, flat. Its connection with the working wire is preferably by means of a double-billed cooper hook, $i$, in the bights of which the working wire is engaged, and the shank of which is connected with a coupling plate, $i^x$, of ivory or other preferred non-conducting material, to which plate the near end of the filament is, in any preferred manner, also connected, the distant end of said filament being, of course, connected to the take-up spring. Formed, or suitably affixed, upon the axial pin of the pointer, is a shoulder, preferably in the form of a horizontal disk or collar, Fig. 11, which we term the pin disk, $d^x$, and from the upper face of which are erected in appropriate adjacency a pair of pins $d^3$ $d^4$, between which and around the shaft the continuous filament is bent in the manner shown in the figures of the drawings last above referred to. The filament must be sufficiently large, stiff, and resilient, to assume when in position and subjected to its normal strains, two gradual bends, as shown in the drawings. At these bends there is of course tension or springiness. As, then, the pointer moves in response to an expansion of the wire, the bend of the filament upon one side of the axial pin will become as much more or less obtuse as the bend upon the other side becomes more or less acute, and vice versa. In other words, as much spring will be put into the filament upon one side of the axial pin as is taken out of it on the other.

From a consideration of the relation of the parts under discussion, it will be apparent that there will be no work done on the filament or in its attachment to the pin, the only friction being that of the pivot points in the jewels. An additional advantage possessed by this construction is that it renders it possible, at will, to alter the relative deflection of the pointer for given differences of electric pressure. Thus it will be obvious that for a given expansion of the working wire, the filament being in the position represented in Fig. 14, there will be a greater movement than there will be with the filament in the position represented in Fig. 13, and this because the effective radius of the bend in the portion of the filament attached to the working wire, at which the filament works, is much less.

With the bends in the filament in the position represented in Fig. 15, which is the opposite extreme to that represented in Fig. 14, a given expansion of the working wire will occasion a minimum deflection of the pointer, and vice versa. That this capability of adjustment of the bends of the filament, to vary the relation of the deflections of the pointer, is of value will be apparent from the following considerations:—Hot wire instruments, as is well known, measure the value of an electrical current by measuring the heat energy produced by said current. Exactly, this may be expressed as being equal to E C—(E being the volts or pressure, and C the ampères or current produced by this E). But $E = CR$ by Ohm's law, $\therefore$ $E C = C^2 R$, $\therefore$ the heat energy, itself proportional to the expansion of the wire, varies as the square of the current and directly as the resistance. If the resistance remains constant, as it does practically in all the alloys suitable for use in instruments of this kind, then the deflections will be proportional to the square of the current, and hence the division of the scale corresponding to equal increments of current will become larger and larger the greater the electromotive force being measured. By properly setting the pin collar therefore, for instance in the position represented in Fig. 14, the early deflections may be made large and the later ones small in order to "even up," so to speak, this $C^2 R$ law. Although, as stated, we prefer to connect the filament with the axial pin of the pointer, in the manner already described, it is, of course, possible to connect it in other ways:—Thus, for instance, as in Fig.

19, the filament may be doubled back upon itself, passed through a vertical slot in the axial pin and secured with a wedge or by other means;—or a radial slot in the pin collar may be punched up upon the filament doubled back upon itself, as shown in Fig. 20;—or two filaments may be applied, each secured by being pinched within a separate slot in the disk, or by being soldered, as shown respectively in Figs. 18 and 16; or a continuous filament may be wrapped around either the axial pin (or the disk) and secured in any preferred manner, as shown in Fig. 17. We instance these constructions as obvious modes of application and utilization of the bent and springy filament as a connecting device between the working wire and the pointer.

In order to permit of the ready adjustment or taking up of the filament, we find it convenient to provide an adjusting block $i^2$, erected upon and supported from a laterally extended arm of the carrying plate, C, and provided with a spring plate $i^3$ controlled by an adjusting screw $i^4$, to the free extremity of which plate the distant end of the take-up spring is in any preferred manner connected, as shown in Fig. 1.

It will, of course, be understood that the adjusting blocks $f, f^6, g^\times$, and $i^2$,—are all properly insulated from the carrying plate, conveniently by superimposing them upon basal strips of mica or rubber, and causing the attaching screws by which they are screwed to the plate, to pass through bushings of any preferred insulating material as shown in Figs. 8 and 9. The circuit of the instrument is, of course, continuous through the adjusting blocks $f$ and $g^\times$ of the working wire.

Having thus described our invention it is proper to add that minor details which involve simply the mechanical construction of the instrument, may be altered or modified at will without departure from the spirit of our invention.

Having thus described our invention, we claim—

1. In a measuring instrument for measuring electrical currents, in combination:—a working wire through which a current is caused to pass,—a pointer connected with said wire,—a plurality of compensating wires, each substantially identical with the working wire,—and means for maintaining all of the wires under tension,—substantially as described.

2. In a measuring instrument for measuring electrical currents, in combination:—a working wire through which a current is caused to pass,—a pointer connected with said wire,—a plurality of compensating wires each substantially identical with the working wire,—and a spiral spring support for maintaining all of the wires under tension,—substantially as described.

3. In a measuring instrument for measuring electrical currents, in combination:—a working wire through which a current is caused to pass,—a pointer connected with said wire,—a plurality of compensating wires each substantially identical with the working wire,—a spiral spring support for maintaining all of the wires under tension,—and means for adjusting the set of said support,—substantially as described.

4. In a measuring instrument for measuring electrical currents, in combination:—a working wire through which a current is caused to pass,—a pointer connected with said wire,—a plurality of compensating wires each substantially identical with the working wire,—a spiral spring support for maintaining all of the wires under tension,—and adjusting devices opposite to this support to which the distant ends of the wires are connected,—substantially as described.

5. In a measuring instrument for measuring electrical currents, in combination:—a working wire through which a current is caused to pass,—a pointer connected with said wire,—a plurality of compensating wires, each substantially identical with the working wire,—means for maintaining all of the wires under tension,—and a carrying frame for the aforesaid devices having a connection of small area with the case or support,—substantially as described.

6. In a measuring instrument for measuring electrical currents, in combination:—a working wire through which a current is caused to pass,—a pointer connected with said wire,—a plurality of compensating wires each substantially identical with the working wire,—a spiral spring support for maintaining all of the wires under tension,—and a carrying frame for the aforesaid devices having a connection of small area with the case or support,—substantially as described.

7. In a measuring instrument for measuring electrical currents, in combination:—a working wire through which a current is caused to pass,—a pointer connected with said wire,—a plurality of compensating wires each substantially identical with the working wire,—a spiral spring support for maintaining all of the wires under tension,—means for adjusting the set of said support,—and a carrying frame for the aforesaid devices having a connection of small area with the case or support,—substantially as described.

8. In a measuring instrument for measuring electrical currents, in combination:—a working wire through which a current is caused to pass,—a pointer connected to said wire,—a plurality of compensating wires each substantially identical with the working wire,—a spiral spring support for maintaining all of the wires under tension,—adjusting devices opposite to the support to which the distant ends of the wires are connected,—and a carrying frame for the aforesaid devices having a connection of small area with the case or support,—substantially as described.

9. In a measuring instrument for measuring electrical currents, in combination:—a working wire through which a current is caused to pass,—a pointer connected with said wire,—a plurality of compensating wires, each substantially identical with the working wire, that is to say each possessing the same or nearly the same diameter, length, and coefficient of linear expansion,—tensional devices applied to the respective extremities of all of the wires for maintaining them under uniform tension,—and adjusting devices applied to both sets of tensional devices,—substantially as described.

10. A tensional device for maintaining the working and compensating wires of a measuring instrument of the class herein set forth, which consists of a spiral band spring the inner end of which is connected with a fixed support, and to the outer end of which the ends of the wires are connected,—substantially as described.

11. A tensional device for maintaining the working and compensating wires of a measuring instrument of the class herein set forth, which consists of a spiral band spring the inner end of which is connected with a fixed support, and to the outer end of which the ends of the wires are connected by means of a flanged extension of the spring which has apertures through which the ends of the wires are passed,—substantially as described.

12. In a measuring instrument for measuring electrical currents,—as a device for supporting and permitting the adjustment of the spring support,—the adjusting block $g^x$ in insulated attachment to the carrying frame, and provided with a stud $g$ to which the spring support is connected,—in combination with means for adjusting the rotary set of said support,—substantially as described.

13. In a measuring instrument for measuring electrical currents,—as a device for maintaining and adjusting the outer extremities of the working and compensating wires,—the adjusting blocks $f\ f^6$, in insulated attachment to the carrying frame, respectively provided with the apertured spring plates $f^x, f^7$,—and with means for adjusting said plates,—substantially as described.

14. In a measuring instrument for measuring electrical currents, in combination:—a working wire through which a current is caused to pass,—a pointer having an axial pin the rotary movement of which occasions the deflection of a pointer relatively to a scale,—a take-up spring,—and a connection between the working wire and the take-up spring constituted by a filament connected intermediately of its length with the axial pin of the pointer, and composed of sufficiently springy metal to take on or assume a bend between the axial pin and the working wire and a second bend between the axial pin and the take-up spring,—substantially as described.

15. In a measuring instrument for measuring electrical currents, in combination:—a working wire over which a current is caused to pass,—a pointer having an axial pin the rotary movement of which occasions the deflection of the pointer relatively to a scale,—a take-up spring,—and a connection between the working wire and the take-up spring constituted by a filament connected intermediately of its length with the axial pin of the pointer, and composed of sufficiently springy metal to take on or assume a bend between the axial pin and the working wire and a second bend between the axial pin and the take-up spring,—and suitable means for connecting the filament with the axial pin in such manner that the radius of the respective bends may be altered or adjusted at will to vary the relations of the pointer,—substantially as described.

16. In a measuring instrument for measuring electrical currents, in combination:—a working wire,—a take-up spring,—an axial pin provided with a pointer,—and a connecting rolled filament of metal, preferably phosphor bronze, which possesses such elastic quality as to permit it to assume, render up, and re-assume, bends of varying radius, and which is intermediate of its length connected with the pin and at its extremities, respectively, with the wire and with the take up spring,—substantially as described.

17. As a device for connecting a continuous filament with the axial pin of a pointer and permitting the adjustment of said filament longitudinally,—the pin disk $d^x$ applied to the axial pin, and provided with pins $d^3\ d^4$ between which and around the axial pin a portion of the filament is bent or sprung,—substantially as described.

18. In a measuring instrument for measuring electrical currrents, in combination with a working wire through which a current is caused to pass and a pointer connected with said wire,—a continuous filament,—a pointer-provided axial pin,—means for connecting said filament with said pin,—a take-up spring,—and means for adjusting the tension of said take-up spring,—substantially as described.

19. In a measuring instrument for measuring electrical currents, in combination with a working wire through which a current is caused to pass,—a pointer connected with said wire,—a continuous filament,—a pointer-provided axial pin,—means for connecting said filament with said pin,—a take-up spring,—and a hook connected with the working wire by being hooked thereupon and with the inner end of the filament by an insulating coupling link,—substantially as described.

20. In combination with the cover of the case of an electrical measuring instrument,—a chamber for containing an extra resistance, formed by metal plates, one of which constitutes an exterior surface of the cover, the other of which is applied to the under side of the cover, and between which the resistance is disposed, whereby extensive radiating surfaces are provided,—substantially as described.

21. As a device for preventing tampering with the contents of an extra resistance chamber formed in the cover of the case of an electrical measuring instrument,—a flange-plate $b'$ secured to the cover by screws,—the protecting rods $b^6$ adapted to the apertures $b^7$, and to the segmental slots $b^8$ in the cover, for protecting and covering said screws,— and seals for securing said rods in position,—substantially as described.

In testimony that we claim the foregoing as our invention we have hereunto signed our names this 9th day of September, A. D. 1893.

ELMER G. WILLYOUNG.
MADISON M. GARVER.

In presence of—
J. BONSALL TAYLOR,
F. NORMAN DIXON.